United States Patent Office 3,780,031
Patented Dec. 18, 1973

3,780,031
PROCESS FOR PREPARING CEPHALOSPORIN COMPOUNDS
Burton G. Christensen, Scotch Plains, N.J., and William J. Leanza, Staten Island, N.Y., assignors to Merck & Co., Inc., Rahway, N.J.
No Drawing. Filed Nov. 29, 1971, Ser. No. 203,054
Int. Cl. C07d 99/16, 99/24
U.S. Cl. 260—243 C                    6 Claims

ABSTRACT OF THE DISCLOSURE

A process for preparing 7-acylamino-7-methoxy cephalosporins is provided which comprises reacting a 7-imino-7-methoxy cephalosporin with a substituted acetic acid halide, and recovering the product.

---

This invention relates to a process for preparing the compound of the formula:

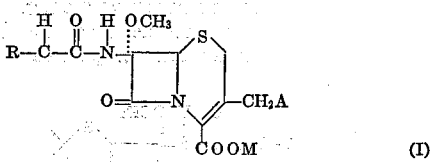

(I)

wherein X is hydrogen, amino, or carboxyl; R is phenyl or a 5-membered heterocyclic ring having 1-2 hetero atoms, the latter being either S, O, or N;

A is hydrogen, loweralkanoyloxy, carbamoyloxy, thiocarbamoyloxy, N-loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

In summary, this invention provides a route for the acylation of a compound of the formula:

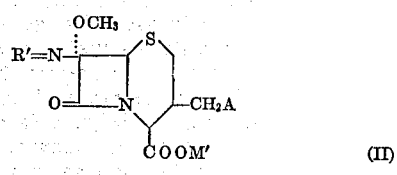

(II)

where R' is

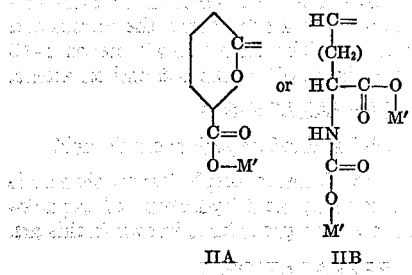

IIA         IIB and M' can be the same or different, and can be benzhydryl, trimethylsilyl, trichloroethyl,tert-butyl, methoxymethyl, benzoylmethyl, methoxybenzyl, or benzyl.

The acylation reagent is a substituted acetic acid halide or anhydride, and most preferably the substituted acetic acid chloride having the formula:

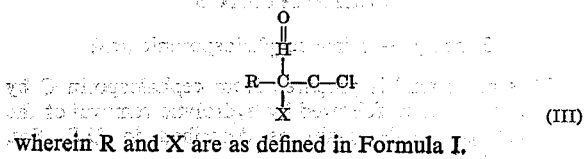

(III)

wherein R and X are as defined in Formula I.

The reaction conditions of the acylation reaction can vary within the following specified parameters. Most conveniently, the two reactants, in approximately equimolar proportions, are mixed together in an inert solvent such as methylene chloride, at ambient temperatures. The reaction takes place spontaneously and only slight stirring may be desirable to ensure a homogeneous reaction mixture. After 1-10 hours, the reaction is terminated by adding the mixture to a relatively large volume of water. The water serves to cleave the side chain R' from the molecule, leaving the acyl side chain in place. The water can optionally contain 2-5% of added sodium bicarbonate, to form an alkaline hydrolysis medium. Following hydrolysis, the end product I can be removed and purified using standard techniques.

One of the starting materials used in this inventive process, the compound of Formula IIB, is easily prepared from a 7-methoxy-7-aminocephalosporin. This latter compound is not a part of this invention but preparative examples are given within, describing how it can be synthesized. Once the desired 7-amino-7-methoxy-cephalosporin is obtained, it is admixed with D-5-t-butoxycarbonylamino-5-(2,2,2 - trichloroethoxy)carbonyl pentanal, to yield the 7 - [D-5-t-butoxycarbonylamino-5-(2,2,2-trichloroethoxy)carbonylpentylidineimino] - 7 - methoxycephalosporin derivative, IIB. The latter can be isolated and purified, if desired, before reaction with the substituted acetic acid halide.

The other starting material used in this process, the compound of Formula IIA, can be synthesized from cephalosporins having 7-[5-N-t-butoxycarbonylamino-5-(carboxy)valeramido] - 7 - methoxy substituents. The 7-side chains of the latter compounds are produced by fermentation, using such organisms as various Streptomyces species, especially *S. lactamdurans* NRRL 3802 or *S. clavuligerus* NRRL 3585. Once the pure compound is isolated from the fermentation broth, the carboxylic acid groups at position 4 of the cephalosporin nucleus and at position 5 of the valeramido side chain are blocked, suitably by, e.g., a trichloroethyl group. The free amino group is then regenerated at position 5 of the valeramido side chain by treatment with, for instance, trifluoroacetic acid, and the compound reacted with nitrosonium hexafluorophosphate in a solvent such as nitromethane. This latter reagent causes formation of the cyclic iminolactone IIA hydrogen fluorophosphate salt, although this structure is not isolated from the reaction medium. The substituted acetic acid halide is then added to the reaction mixture, and the acylation proceeds spontaneously, as described above. The iminolactone R' is then removed as described, using hydrolysis, preferably an aqueous sodium bicarbonate solution.

The blocking group at the 4-carboxylic acid functionality is then removed, using, e.g., hydrolysis, hydrogenation, etc. The exact route depends on the identity of the M' group, but this choice is within the skill of those in the art.

The final products of Formula I, generally termed 7-acylamino-7-methoxy cephalosporins, are useful as antibacterial agents against both gram-positive and gram-negative bacteria. In addition, resistance to β-lactamases has been demonstrated. The activity spectrum includes effectiveness against many bacteria, including in vivo on *Proteus morganii*, and in addition, against *E. coli*, *P. vulgaris*, *P. mirabilis*, *S. Schottmuelleri*, *K. pneumoniae* AD, *K. pneumoniae* B, and *P. arizoniae*.

In addition to the specific end product as defined in structural Formula I, other compounds which are active antibacterials can also be prepared using the process described herein. The compounds which can be prepared have the following structural formula:

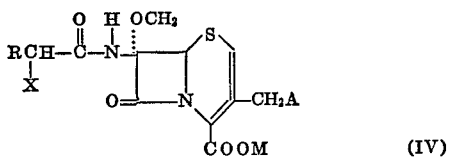

(IV)

In addition, the analogous Δ²-cephalosporines can also be prepared using the processes of this reaction; the Δ² compounds are valuable intermediates due to increased acid stability, and the Δ³ compounds can be easily prepared from the Δ² compounds. The various substituents have the following meanings: X is hydrogen, halo, amino, guanidino, phosphono, hydroxy, tetrazolyl, carboxyl, sulfo, or sulfamino;

R is phenyl, substituted phenyl, a monocyclic heterocyclic 5- or 6-membered ring containing one or more oxygen, sulfur, or nitrogen atoms in the ring, substituted heterocycles, phenylthio, heterocyclic, or substituted heterocyclic thio-groups, or cyano; the substituents on the R group being halo, carboxymethyl, guanidino, guanidinomethyl, carboxamidomethyl, aminomethyl, nitro, methoxy, or methyl;

A is hydrogen, hydroxy, halo, mercapto, cyano, alkanoyloxy, alkanoylthio, aroyloxy, aroylthio, heteroaryloxy or heteroarylthio, the hetero ring having 5–6 members and having 1–3 hetero atoms, being O, S, or N or combinations thereof, azido, amino, carbamoyloxy, alkoxy, alkylthio, carbamoylthio, thiocarbamoyloxy, benzoyloxy, (p - chlorobenzoyl)oxy, (p-methylbenzoyl)oxy, pivaloyloxy, (1 - adamantyl)carboxy, substituted amino such as alkylamino, dialkylamino, alkanoylamino, carbamoylamino, N-(2-chloroethylamino), 5-cyano-triazol-1-yl, 4-methoxycarbonyl-triazol-1-yl, or quaternary ammonium such as pyridinium, 3-methylpyridinium, 4-methylpyridinium, 3 - chloropyridinium, 3-bromopyridinium, 3-iodopyridinium, 4 - carbamoylpyridinium, 4-(N-hydroxymethylcarbamoyl)-pyridinium, 4 - (N-carbomethoxycarbamoyl)pyridinium, 4 - (cyanocarbamoyl)pyridinium, 4-(carboxymethyl)pyridinium, 4 - (hydroxymethyl)pyridinium, 4-(trifluoromethyl)pyridinium, quinolinium, picolinium, or lutidinium; N-loweralkylcarbamoyloxy, N,N-diloweralkylthiocarbamoyloxy, alkanoylcarbamoyloxy, hydroxyphenyl, sulfamoyloxy, alkylsulfonyloxy, or (cis-1,2-epoxypropyl)phosphono; and M is an alkali metal, benzyl, alkanoyloxymethyl, alkylsilyl, phenalkanoyl, benzhydryl, alkoxyalkyl, alkenyl, trichloroethyl, hydrogen, benzoylmethyl or methoxybenzyl.

Preferably, in the compounds of Formula IV, X is hydrogen, amino, or carboxyl;

R is phenyl, or a 5–6 membered heterocyclic ring having 1–2 heteroatoms, the latter being either S, O, or N;

A is hydrogen, halo, azido, cyano, hydroxy, alkoxy, carbamoyloxy, thiocarbamoyloxy, N-loweralkylcarbamoyloxy, N,N-diloweralkylcarbamoyloxy, N-loweralkylthiocarbamoyloxy, N,N - diloweralkylthiocarbamoyloxy, alkanoyloxy, aroyloxy, mercapto, alkylthio, amino, alkylamino, alkanoylamino, hydroxyphenyl, sulfamoyloxy, quaternary ammonium, alkylsulfonyloxy, or (cis - 1,2-epoxypropyl)phosphono; and M is alkali metal, benzyl, alkylsilyl, phenalkanoyl, alkoxylalkyl, pivaloyloxymethyl, alkenyl, trichloroethyl, hydrogen, benzoylmethyl, or methoxybenzyl.

Even more preferably, X is hydrogen, amino, or carboxyl; R is phenyl or a 5-membered heterocyclic ring having 1–2 hetero atoms, the latter being either S, O, or N;

A is hydrogen, loweralkanoyloxy, heteroarylthio, carbamoyloxy, thiocarbamoyloxy, N - loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

Still more preferably, X is hydrogen or carboxyl;

R is phenyl, or a 5-membered heterocyclic ring having one O or one S hetero atom;

A is hydrogen, loweralkanoyloxy, carbamoyloxy, N-loweralkylcarbamoyloxy, N,N - diloweralkylcarbamoyloxypyridinium, alkylpyridinium, halopyridinium, or aminopyridinium; and M is sodium, potassium, benzhydryl, methoxymethyl, or hydrogen.

Most preferably, X is hydrogen or carboxyl;

R is phenyl, thienyl, or furyl;

A is hydrogen, loweralkanoyloxy, carbamoyloxy, or pyridinium; and

M is sodium, potassium, benzhydryl, methoxymethyl, or hydrogen.

In addition, compounds of Formula IV above wherein the sulfur atom is present as the sulfoxide,

can be prepared in this inventive reaction. It will also be apparent that the process described herein can also be used to prepare analogous compounds in the penicillin series, viz.:

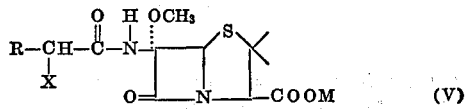

(V)

wherein R, X and M are the same as defined in Formula IV, to yield the methoxylated penicillins.

The compounds of Formula IV can generally be prepared from 7-ACA or known derivatives thereof using the general process outlined in the preparative examples.

The blocking group on the acid functionality at position 4 of the cephalosporin ring can be removed following any of the reactions of this invention. The removal can be accomplished using methods available to those in the art.

The penicillins of Formula V can be prepared from 6-APA or known derivatives thereof using procedures analogous to those described for the cephalosporins.

Other starting materials useful in the application of these inventive reactions to prepare the end compounds described herein can be prepared in accordance with known methods, see, e.g., Belgium Patent 650,444 or U.S. Pat. 3,117,126, or using the following preparations.

The term "loweralkyl" is employed to mean a carbon chain having 1–6 carbon atoms; when more than one loweralkyl group appears in a substituent, the groups can be the same or different. The term "alkyl" means 1–10 carbon atoms; "loweralkanoyl" means 1–6 carbon atoms.

PREPARATION 1

3-hydroxymethyl-7-aminodecephalosporanic acid

The 3-hydroxymethyl-7-aminodecephalosporanic acid is obtained as the lactone by acid hydrolysis of cephalosporin C in accordance with procedures known in this art.

PREPARATION 2

3-pyridiniummethyl-7-aminodecephalosporanic acid

This compound is prepared by treating cephalosporin C with pyridine followed by acid hydrolysis as described in U.S. Pat. 3,117,126.

PREPARATION 3

3-methyl-7-aminodecephalosporanic acid

This compound is prepared from cephalosporin C by catalytic reduction followed by hydrolytic removal of the 5-aminodipoyl side chain as described in U.S. Pat. 3,129,224.

PREPARATION 4

3-chloromethyl-7-aminodecephalosporanic acid

This compound is prepared from the 3-methyl compound by reaction with chlorine gas. The bromomethyl or iodomethyl derivatives can be prepared from the 3-hydroxymethyl compound by reaction with phosphorus tribromide or phosphorus triiodide, respectively.

PREPARATION 5

3-carbamoyloxymethyl-7-aminodecephalosporanic acid 7-aminocephalosporanic acid is treated with 5-butoxycarbonylazide to produce the 7β-(t-butoxycarbonyl)derivative in accordance with known methods. This derivative is then intimately contacted with citrus acetylesterase in aqueous phosphate buffer at pH 6.5–7 for 15 hours and 3-hydroxymethyl 7β-(t-butoxycarbonyl)aminodecephalosporanic acid is recovered from the resulting reaction mixture.

To 0.2 g. of 3-hydroxymethyl 7β-(t-butoxycarbonyl) aminodecephalosporanic acid suspended in 5 ml. of acetonitrile, cooled to 0° C. and maintained under nitrogen atmosphere is added 0.15 ml. of chlorosulfonyl isocyanate. The reaction mixture is stirred for 70 minutes and then evaporated under diminished pressure to dryness. The resulting residue is taken up in 10 ml. of ethylacetate and 10 ml. of 0.1 N phosphate buffer. The pH of the aqueous layer is adjusted to about 1.6 and the mixture stirred for 2½ hours at room temperature. The pH is then adjusted to about 8 with aqueous tripotassium phosphate solution, and the aqueous phase is separated. The organic phase is separated. The organic phase is re-extracted with 10 ml. of phosphate buffer at pH 8. The combined aqueous phase is adjusted to pH 2.1 with hydrochloric acid and extracted twice with ethylacetate. The ethylacetate extractions are dried over sodium sulfate and evaporated under diminished pressure to afford 0.055 g. of residue. This residue is washed with ether to afford 3 - carbamoyloxymethyl-7β - (t-butoxycarbonyl) aminodecephalosporanic acid which is recovered as a yellow solid.

3-carbamoyloxymethyl-7β-(t - butoxycarbonyl)aminodecephalosporanic acid (0.5 g.) is stirred with 2 ml. of trifluoroacetic acid at 0° C. for 5 minutes. The resulting reaction mixture is evaporated under reduced pressure to afford 3-carbamoyloxymethyl - 7 - aminodecephalosporanic acid which is purified by crystallization from ethylacetate.

PREPARATION 6

Trimethylsilyl 3-carbamoyloxymethyl-7-aminodecephalosporante

A mixture of 0.5 mg. of 3-carbamoyloxymethyl-7-aminodecephalosporanic acid, 2 ml. of hexamethyldisilazane and 8 ml. of chloroform is stirred overnight at reflux temperature protected from moisture. The solvent and excess hexamethyldisilazane are removed at reduced pressure, leaving a residue containing trimethylsilyl 3-carbamoyloxymethyl-7-aminodecephalosporanate.

PREPARATION 7

Benzhydryl 7-amino-7-methoxy-3-carbamoyloxyethyl-decephalosporanate (A) 7 - amino-3-carbamoyloxymethyldecephalosporanic acid benzhydryl ester.—272 mg. of 7-amino-3-carbamoyloxymethyldecephalosporanic acid is slurried 5 min. at 25° C. in 7 ml. dioxane with 170 mg. p-toluenesulfonic acid·H₂O. Methanol (2 ml.) is added, the solvents are removed in vacuo, and dioxane is twice added and evaporated in vacuo. Dioxane (8 ml.) is added, and then 290 mg. diphenyldiazomethane. After the evolution of nitrogen is complete, the solvent is distilled in vacuum, and the residue stirred with methylene chloride (10 ml.) and water (10 ml.) containing sufficient $K_2HPO_4$ to bring the pH to 8. The layers are separated and the aqueous portion extracted twice more with $CH_2Cl_2$. The combined organic layers are dried with sodium sulfate, filtered and evaporated, leaving oily crystals. Washing with ether affords a dry solid which is the product, 7-amino - 3 - carbamoyloxymethyldecephalosporanic acid benzhydryl ester.

In a like manner, the benzhydryl and other esters of 3-methyl-7-aminodecephalosporanic acid, 3-chloromethyl-7-aminodecephalosporanic acid, and 7 - aminocephalosporanic acid can be prepared.

(B) 7 - (benzylideneamino) - 3 - carbamoyloxymethyl-decephalosporanic acid benzhydryl ester.—The 7-amino-3-carbamoyloxymethyldecephalosporanic acid benzhydryl ester, as prepared in Step A, 439 mg., is refluxed one hour in 50 ml. benzen with 106 mg. benzaldehyde in an azeotropic drying apparatus. The solvent is vacuum distilled away, leaving 527 mg. of product which is used in the next step without further purification. Samples show the structure to be the 7-(benzylideneamino)-3-carbamoyloxymethyldecephalosporanic acid benzhydryl ester.

The other esters prepared in Step A can also be reacted to form the imino derivatives of the above precedure.

(C) Benzhydryl 3-carbamoyloxymethyl - 7 - methoxy-7 - benzylideneaminodecephalosporanate.—Benzhydryl 7-(benzylideneamino) - 3 - carbamoyloxymethyldecephalosporanate, 527 mg., is dissolved in 20 ml. dry tetrafuran. At —78° C., under nitrogen, 0.435 of 2.3 M phenyl lithium is added. The reaction mixture is allowed to rise in temperature to —50° C. The intermediate compound, benzhydryl 3 - carbamoyloxymethyl - 7 - benzylidene-amino-7-lithiodecephalosporante is thereby prepared but is not isolated or further characterized. It is identified by the presence of an intense blue coloration in the reaction mixture.

The solution mixture is then brought to 0° C. and stirred vigorously with one equivalent of bis(methyl) peroxide for ten minutes. 200 ml. of benzene is added, and the solution is washed three times with water, dried over $MgSO_4$, filtered and evaporated, yielding benzhydryl 3-carbamoyloxymethyl - 7-methoxy-7-benzylideneamino-decephalosporanate.

(D) Benzhydryl 3 - carbamoyloxymethyl-7-methoxy-7-aminodecephalosporanate.—A solution of benzhydryl 3-carbamoyloxymethyl - 7 - methoxy - 7 - benzylidene-aminocephalosporante (304 mg.) in 3 ml. of ethanol and 0.5 ml. of methylene chloride is added to a solution of 100 mg. of powdered, 2,4-dinitrophenyl hydrazine, 85.5 mg. of p-toluenesulfonic acid monohydrate, and 3 ml. of absolute alcohol.

The mixture is stirred for 30 minutes, filtered and after the filter cake has been thoroughly washed with ethanol, the filtrates are evaporated under reduced pressure at or below ambient temperature. The resultant solid is washed several times with ether and dried in a nitrogen stream. This solid is the benzhydryl 7-hydroxy-7-amino-7-amino-cephalosporanate tosylate salt.

The tosylate salt is converted to the free amine using the following procedure:

A mixture of 3.5 ml. of ether, 0.5 ml. of ethyl acetate, 2 ml. of water and 22 mg. of dipotassium hydrogen phosphate is prepared. To this is added 100 mg. of benzhydryl 7-hydroxy-7-aminocephalosporanate tosylate salt and the mixture is shaken vigorously for several minutes. After phase separation the aqueous phase is again extracted with ether, the combined organic phases are dried over anhydrous magnesium sulfate, and evaporated to a gum under reduced pressure. The product is flushed several times by dissolving it in a small volume of chloroform and again evaporating to a gum under high vacuum. The product so obtained exhibits IR and NMR spectra consistent with the assigned structure for benzhydryl 7-methoxy-7-amino-3-carbamoyloxymethylcephalosporanate.

PREPARATION 8

Benzhydryl 7-amino-7-methoxy-3-carbamoyloxymethyl-decephalosporanate (A) 7-amino-3-carbamoyloxymethyldecephalosporanic acid benzhydryl ester.—This compound is prepared as described in Preparation 7, Step A.

(B) Benzhydryl 7-diazo-3-carbamoyloxymethyldecephalosporanate.—To a stirring mixture of 1.6 g. of NaNO₂, 30 ml. of water and 40 ml. of CH₂Cl₂ at 0° C. is added 880 mg. (.002 mole) of benzhydryl 7-amino-3-carbamoyloxymethyldecephalosporanate, followed by the addition of a solution of 760 mg. (.004 mole) of p-toluenesulfonic acid in 5 ml. water over a few minutes. The mixture is stirred at 0° C. for 20 minutes, then the organic phase is cut away, washed with 1×10 cc. ice water, dried over Na₂SO₄ at 0° C., filtered and concentrated in vacuo at room temperature to yield a glassy substance, benzhydryl 7-diazo-3-carbamoyloxymethyldecephalosporanate.

(C) Benzhydryl 7-bromo-7-azido-3-carbamoyloxymethyldecephalosporanate.—To a solution of 90 mg. of benzhydryl 7-diazo-3-carbamoyloxymethyldecephalosporanate in 20 ml. methylene chloride and 10 ml. nitromethane at 0–10° C. is added all at once the

solution followed by the BrN₃ solution, then 50 ml. of water is added followed by the addition of solid NaHCO₃ to pH 8. Both the triethylammonium azide and the bromine azide are prepared as described below.

The organic layer is separated and extracted with 2×20 ml. water, dried over Na₂SO₄ and concentrated in vacuo, to yield benzhydryl 7-bromo-7-azido-3-carbamoyloxymethyldecephalosporanate.

PREPARATION OF BrN₂ SOLUTION

To 8 ml. of CH₂Cl₂ at 0° C. is added 2.66 g. (.04 mole) of NaN₃ followed by 0.65 g. (.0042 mole) of bromine. To this stirring mixture at 0° C. is added dropwise 2 ml. of concentrated hydrochloric acid. The mixture is stirred for 3 hours at 0° C.

The organic layer is decanted and the aqueous layer extracted with 1×5 ml. of CH₂Cl₂. The combined organic phase is stored at −10° C.

PREPARATION OF Et₃NHN̄₃ SOLUTION

To a slurry of 1.5 g. of NaN₃ in 5 ml. water and 10 ml. CH₂Cl₂ at −10° C. is added dropwise at −10° C. to 0° C. 4 ml. of 50% H₂SO₄. The organic phase is poured off the aqueous paste, and the aqueous extract washed with 1×5 cc. of CH₂Cl₂. The combined organic phase is dried over CaCl₂. The decanted HN₃ solution is brought to pH 7 with Et₃N and stored at −10° C.

(D) Benzhydryl 7 - methoxy-7-azido-3-carbamoyloxymethyldecephalosporanate.—To a solution of 400 mg. (.00072 mole) of benzhydryl 7-bromo-7-azido-3-carbamoyloxymethyldecephalosporanate in 30 ml. methanol is added 150 mg. (.0008 mole) of AgBF₄. The mixture is stirred in the dark for 2½ hours.

The mixture is concentrated in vacuo and the residue taken up in 50 ml. of CH₂Cl₂ filtered. The filtrate is extracted twice with saturated NaHCO₃ solution, twice with water, dried over anhydrous MgSO₄ and concentrated in vacuo to yield the solid crystalline benzhydryl 7-methoxy-7-azido-3-carbamoyloxycephalosporanate.

(E) Benzhydryl 7 - methoxy-7-amino-3-carbamoyloxymethyldecephalosporanate.—1.0 g. of benzhydryl 7-azido-7-methoxy - 3 - carbamoyloxymethyldecephalosporanate is dissolved in 100 ml. of dioxane. 1.0 g. of platinum oxide is added and the reaction mixture stirred under hydrogen at atmospheric pressure for one hour. Another 1.0 g. quantity of platinum oxide is added and the reaction mixture is again placed under hydrogen and stirred for three hours until the azide is completely reacted as determined by infrared analysis of aliquots. The solvent is removed under reduced pressure and the residue taken up in 50 ml. of chloroform and filtered through silica gel G in chloroform in a 60 ml. sintered glass funnel. The material is eluted with chloroform until 200 ml. of chloroform has been collected. The chloroform is removed under reduced pressure affording benzhydryl 7-methoxy-7-amino - 3 - carbamoyloxymethyldecephalosporanate.

PREPARATION 9

Monosodium-(D-5-amino-5-carboxyvaleramido)-3-carbamoyloxymethyl)-7-methoxy-decephalosporanate

Modified fermentation process

Step 1: Slants

A lyophilized tube of *Streptomyces lactamdurans* culture (MA-2908) was opened aseptically and the organism transferred to a medium of the following composition:

Medium XI:
  1% Blackstrap molasses
  1% National brewer's yeast
  2.5% Difco agar  pH 7.0
  Water to volume The slants are inoculated for seven days at 28° C. When stored in the cold, the slants are stable for more than 13 weeks.

Step 2: Seed stages: Two-stage system

First seed.—The first seed is inoculated directly from the slant of Step 1 to 40 ml. of 1% Primary Dried Yeast N.F., pH 7.0 (obtained from the Yeast Product Corporation) in a 250 ml. baffled Erlenmeyer flask. The flasks were then shaken on a 220 r.p.m. rotary shaker with a 2-inch throw at 28° C. for a period of from two to three days.

Second seed.—A 2.5% inoculum from the first seed stage was added to a flask containing a 2% Fleischmann S-150 yeast autolysate, pH 7.0. The growth in this stage is characteristically light and the incubation, performed as in the first stage, was not extended beyond 48 hours.

Step 3: Production medium

The production medium contains per liter of distilled water 30 g. distiller's solubles; 7.5 g. of Primary Dried Yeast N.F. and 0.25% v./v. Mobilpar-S defoamer. The medium is adjusted to pH 7.0 with a small amount of concentrated sodium hydroxide solution, dispensed into Erlenmeyer flasks and autoclaved for 15 to 20 minutes at 121° C. After cooling the medium received a 2.5% inoculum of the seed obtained in Step 2. The time of incubation can vary from about 50 hours to 100 hours but an incubation period of about 72 hours is preferred. The volume of media in each flask can vary from 30 to 50 ml. but 40 ml. was used routinely. The level of inoculum can vary from 1% to 5%; but, in practice, a 2.5% level is generally employed.

Step 4: Assay

When the fermentation was complete, the cells were removed by centrifugation and the broth was diluted with phosphate buffer, pH 7.0. The concentration of 7β-(D-5-amino - 5 - carboxyvaleramido) - 3 - (carbamoyloxymethyl)-7-methoxy-3-cephem-4-carboxylic acid in the fermentation broth was determined by the standard biological-disc assay method. The assay organism employed was *Vibrio percolans* (ATCC 8416). Filter paper discs are emersed into the diluted broths and placed on the surface of agar-containing Petri dishes that had been inoculated with the assay organism *Vibrio percolans* (ATCC 8416). Also placed on these Petri dishes are discs that had been dipped previously in standard solutions containing known concentrations of 7β-(D-5-amino-5-carboxyvaleramido)-(3 - carbamoyloxymethyl) - 7 - methoxy-3-cephem-4-carboxylic acid. The discs were incubated overnight at 28° C. and the diameters of the zones of inhibition recorded. The concentration of product and the fermented broth is calculated by interpolation from the standard curve which relates zone diameter with the known concentrations of standard solutions of the product. By this procedure it was calculated that *Streptomyces lactamdurans* MB–2908 produced 78.6 μg./ml. of 7-(D-5-amino - 5 - carboxyvaleramido)-3-carbamoyloxymethyl-7-methoxydecephalosporanic acid in the modified fermentation process.

Step 5: Isolation

The filtered broth is adjusted to pH 7.0 with dilute hydrochloric acid and 2900 ml. is passed through a column containing a strongly basic anion exchange resin (100 g.) having a styrene-divinylbenzene matrix (Dowex 1×2 chloride cycle resin) at 10 ml./minute. The spent solvent is collected in 500 ml. fractions. The resin column is washed with water and eluted with 3% ammonium chloride in 90% methanol. The eluate is collected in 100 ml. fractions. The spent fractions are combined, the pH adjusted to pH 7.2 to 8.0 with dilute sodium hydroxide and adsorbed on a strongly basic anion exchange resin (100 g.) having a styrene-divinylbenzene matrix (Dowex 1 x 2 chloride cycle resin) at 14 ml./minute. The column is washed with water and eluted with 5% aqueous sodium chloride. The eluate is collected in 50 ml. fractions and concentrated. The concentrate is diluted to 500 ml. adjusted from pH 8.8 to pH 2.0 with dilute hydrochloric acid and adsorbed on 25 ml. of a strongly acidic cation exchange resin of the sulfonate type having a styrene-divinylbenzene matrix (Dowex 50 x 2 hydrogen cycle resin) at 2.5 ml./minute. The column is washed with 25 ml. of water then eluted with 2% pyridine until the pH of the column effluent rose to pH 7 (54 ml.). The eluate thus obtained is adjusted to pH 8.0 with dilute sodium hydroxide and concentrated under vacuum to remove the pyridine and afford monosodium-(D-5-amino-5-carboxyvaleramido) - 3 - carbamoyloxymethyl - 7 - methoxy. Elemental analysis for $C_{16}H_{21}N_4SO_9Na$ (percent): Calc.: C, 41.0; H, 4.5; N, 12.0; S, 6.8. Found (percent): C, 39.31; H, 4.76; N, 11.16; S, 6.46.

EXAMPLE 1

Benzhydryl 3-carbamoyloxymethyl-7-methoxy-7-(2-Thienylacetamido)decephalosporanate (A) D-5-tert.-butoxycarbonylamino-5-(2,2,2 - trichloroethoxy)carbonyl pentanal.—A solution of D-5 - t - butoxycarbonylamino - 5 - (2,2,2-trichloroethoxy)-carbonyl pentanoyl chloride (1.2 g.) in 10 ml. of diglyme is cooled to —78° C. under an atmosphere of nitrogen. To this is added with stirring a solution of 0.75 g. of lithium tri-t-butoxyaluminum hydride in 4 ml. of diglyme over a period of one hour. The reaction mixture is allowed to warm to room temperature and poured into water. The aldehyde is extracted into benzene and the benzene solution is washed with water and dried over magnesium sulfate, and used immediately in the following example.

(B) Benzhydryl 7-[D - 5 - t - butoxycarbonylamino-5-(2,2,2 - trichloroethoxy)carbonylpentylidineimino]-3-carbamoyloxymethyl - 7 - methoxydecephalosporanate.—A solution of 0.754 g. of D-5-t-butoxycarbonylamino-5-(2,2,2-trichloroethoxy)carbonylpentanal and 0.94 g. of benzhydryl 7 - amino-3-carbamoyloxymethyl-7-methoxydecephalosporanate in 20 ml. of benzene is refluxed for one hour in an azeotropic drying apparatus. The solvent is removed under vacuum leaving the product benzhydryl 7-[D - 5 - t - butoxycarbonylamino-5-(2,2,2-trichloroethoxy)carbonyl pentylidineimino] - 3 - carbamoyloxymethyl-7-methoxydecephalosporanate which may be used directly in the following acylation procedure. A purified sample is obtained by preparative thin layer chromatography on silica gel.

(C) Benzhydryl 3-carbamoyloxymethyl-7-methoxy-7-(2-thienylacetamido)decephalosporanate (by acylation of 7-aldimino-7-methoxycephalosporanate).—To a solution of 0.85 g. of benzhydryl 7-[D-5-t-butoxycarbonylamino-5 - (2,2,2 - trichloroethoxy)carbonylpentylidineimino]-3-carbamoyloxymethyl-7-methoxydecephalosporanate in 10 ml. of methylene chloride is added 0.16 g. of 2-thienylacetyl chloride. The mixture is stirred at room temperature for two hours then the solution containing benzhydryl 3-carbamoyloxymethyl-7-methoxy-7-[N-(2-thienylacetyl)-D-5-t-butoxycarbonylamino-5-(2,2,2-trichloroethoxy)carbonylpentylidineimmonium] decephalosporanate chloride is poured into water. After completion of the hydrolysis the methylene chloride phase is separated, dried over anhydrous sodium sulfate and evaporated. The residue is chromatographed on silica gel yielding substantially pure benzhydryl 3-carbamoyloxymethyl-7-methoxy-7-(2-thienylacetamido)decephalosporanate.

EXAMPLE 2

2,2,2-trichloroethyl 3-carbamoyloxymethyl-7-methoxy-7-(2-thienylacetamido)decephalosporanate (A) 7-[D-5-N-t-butoxycarbonylamino-5-carboxyvaleramido]-3-carbamoyloxymethyl - 7 - methoxydecephalosporanic acid.—To a solution of 3.0 g. of sodium 7-[D-5-amino-5-carboxyvaleramido] - 3 - carbamoyloxymethyl-7-methoxydecephalosporanate in 15 ml. of methanol is added a slight amount of dilute hydrochloric acid, until the pH is below 7. Then 2.2 g. of t-butoxy carbonyl chloride in 10 ml. of acetone is added, and the mixture stirred for one hour. The solvent is removed by evaporation, and the residue purified by chromatography, yielding 7-[D-5-N-t-butoxycarbonylamino - 5 - carboxyvaleramido]-3-carbamoyloxymethyl-7-methoxydecephalosporanic acid.

(B) 2,2,2-trichloroethyl 7β-[D-5-N-t-butoxycarbonylamino-5-(2,2,2 - trichloroethoxy)carbonylvaleramido]-3-carbamoyloxymethyl - 7 - methoxydecephalosporanate.— To a solution of 4.5 g. of 7β-[D-5-N-t-butoxycarbonylamino-5-carboxyvaleramido] - 3 - carbamoyloxymethyl-7-methoxydecephalosporanic aicd in 20 ml. of methylene chloride is added 3.2 g. of 2,2,2-trichloroethanol and 4 g. of dicyclohexylcarbodiimide. The mixture is stirred at room temperature for six hours, then the precipitated dicyclohexyl urea is removed by filtration. The filtrate is evaporated and the trichloroethoxy ester is purified by chromatography on silica gel.

(C) 2,2,2 - trichloroethyl 7β-[D-5-amino-5-(2,2,2-trichloroethoxy)carbonylvaleramido] - 3 - carbamoyloxymethyl-7-methoxydecephalosporanate.—A solution of two grams of 2,2,2-trichloroethyl-7β-[D-5-N-t-butoxycarbonylamino-5-(2,2,2 - trichloroethoxy)carbonylvaleramido]-3 - carbamoyloxymethyl-7-methoxydecephalosporanate in 20 ml. of trifluoroacetic acid is kept at room temperature for 5 minutes. The excess trifluoroacetic acid is removed under reduced pressure and the residue is taken up in methylene chloride and washed with sodium bicarbonate solution. The organic phase is dried and evaporated giving the bis-trichloroethoxy ester of 7β-(D-5-amino-5-carboxyvaleramido) - 3 - carbamoyloxymethyl - 7 - methoxydecephalosporanic acid.

(D) 2,2,2 - trichloroethyl 3- carbamoyloxymethyl - 7-methoxy-7-(2-thienylacetamido) - decephalosporanate.— Anhydrous magnesium sulfate (1 g.) is added to a cooled solution of 680 mg. of 2,2,2-trichloroethyl 7β-[D-5-amino-5 - (2,2,2 - trichloroethoxy) - carbonylvaleramido] - 3-carbamoyloxymethyl - 7 - methoxydecephalosporanate in 10 ml. of nitromethane, the suspension is vigorously stirred and a solution of 175 mg. of nitrosonium hexafluorophosphate in 2 ml. of nitromethane is added during 5 minutes. The temperature is maintained at 5–10° C.

during the addition and for an additional 5 minutes. To the resulting solution of iminolactone fluorophosphate is added 0.14 ml. of triethylamine followed by a solution of 200 mg. of 2-thienylacetyl chloride in 2 ml. of methylene chloride. The mixture is stirred at room temperature for 20 minutes and the acyl immonium compound thus formed is hydrolyzed by the addition of 20 ml. of 5% sodium bicarbonate solution. The organic phase is separated, washed with pH 2 phosphate buffer and with water, dried over anhydrous magnesium sulfate and evaporated. The residue is purified by chromatography on 40 g. of silica gel yielding 2,2,2-trichloroethyl 3-carbamoyloxymethyl-7-methoxy - 7 - (2-thienylacetamido)decephalosporanate.

EXAMPLE 3

3-carbamoyloxymethyl-7-methoxy-7-(2-thienylacetamido)decephalosporanic acid

Benzhydryl 3 - carbamoyloxymethyl-7-(2-thienylacetamido)decephalosporanate (300 mg.) in 0.5 ml. in anisole and 2.5 ml. of trifluoroacetic acid is reacted for 15 minutes at 10° C. The resulting mixture is evaporated at reduced pressure and flushed twice with anisole. The residue is dissolved in methylene chloride and extracted with 5% sodium bicarbonate solution. The aqueous solution is adjusted to pH 1.8 with 5% phosphoric acid and extracted with ethyl acetate. The organic solution is dried and evaporated to yield the pure 3-carbamoyloxymethyl-7-methoxy-7-(2-thienylacetamido)decephalosporanic acid, M.P. 165–167° C. UV and NMR analysis provide data consistent with the assigned structure.

EXAMPLE 4

3-carbamoyloxymethyl-7-methoxy-7-(2-thienylacetamido)decephalosporanic acid sodium salt 30 mg. of 2,2,2-trichloroethyl 7-methoxy-7-(2-thienylacetamido)-3-carbamoyloxymethyldecephalosporanate is dissolved in 15 ml. of 95% acetic acid. 0.300 g. of zinc dust is added in 5 equal amounts over 20 minutes while the mixture is vigorously stirred at room temperature. The reaction mixture is carefully poured into ice cold pH 2 phosphate buffer and extracted with ethyl acetate. The ethyl acetate extract is washed with water, dried, and evaporated. The residue is taken up in methyl isobutyl ketone (10 ml.) and extracted with 15 ml. of water containing 0.12 g. of sodium bicarbonate. The organic phase is separated and washed once with water. The combined aqueous phase is washed twice with methylene chloride and then freeze-dried to give the crude product. Crystallization from methanol/isopropanol gives the pure 3-carbamoyloxymethyl-7-methoxy-7-(2 - thienylacetamido)decephalosporanic acid sodium salt. If no sodium bicarbonate is present in the extraction, then the free acid is formed; the potassium salt can be prepared using potassium bicarbonate or the like.

What is claimed is:

1. The process for preparing the compound of the formula:

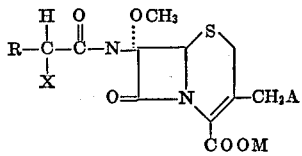

(I)

wherein X is hydrogen, amino, or carboxyl;
R is phenyl, thienyl or furyl;

A is hydrogen, loweralkanoyloxy, carbamoyloxy, thiocarbamoyloxy, N-loweralkylcarbamoyloxy, N-loweralkylthiocarbamoyloxy, N,N - diloweralkylcarbamoyloxy, N,N-diloweralkylthiocarbamoyloxy, pyridinium, alkylpyridinium, halopyridinium, or aminopyridinium; and
M is sodium, potassium, benzyl, benzhydryl, trimethylsilyl, trichloroethyl, methoxymethyl, hydrogen, benzoylmethyl, or methoxybenzyl;

which comprises reacting the compound of the formula:

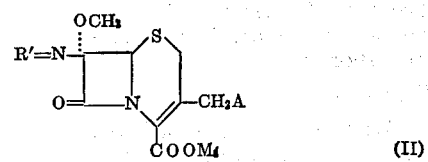

(II)

wherein R' is

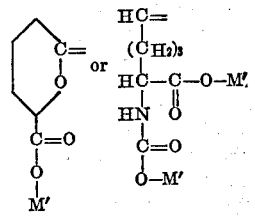

and each M' is the same or different and each is benzhydryl, trimethylsilyl, trichloroethyl, methoxymethyl, benzoylmethyl, methoxybenzyl, or benzyl; with about an equivalent amount of the acylation compound having the formula:

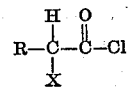

wherein R and X are as defined above, and then deblocking when M is hydrogen, optionally followed by addition of sodium or potassium hydroxide when M is sodium or potassium.

2. The process of claim 1 in which the acylation compound and Compound II are admixed in an inert solvent, at ambient temperatures for from 1–10 hours.

3. The process of claim 1 in which R is phenyl, thienyl, or furyl; A is carbamoyloxy, loweralkanoyloxy, pyridinium, or hydrogen; and X is hydrogen or carboxyl.

4. The process of claim 3 wherein R is thienyl, A is carbamoyloxy, and X is hydrogen or carboxyl.

5. The process of claim 4 wherein X is hydrogen.

6. The process of claim 3 wherein R is phenyl, A is acetoxy, and X is carboxyl.

References Cited

Nagarajan et al., J.A.C.S., vol. 93:9, May 5, 1971, pp. 2308–2312.

NICHOLAS S. RIZZO, Primary Examiner

U.S. Cl. X.R.

260—239.1; 424—246, 271

UNITED STATES PATENT OFFICE
CERTIFICATE OF CORRECTION

Patent No. 3,780,031    Dated December 18, 1973

Inventor(s) Burton G. Christensen & William J. Leanza

It is certified that error appears in the above-identified patent and that said Letters Patent are hereby corrected as shown below:

In column 12, the second formula in Claim 1 should read:

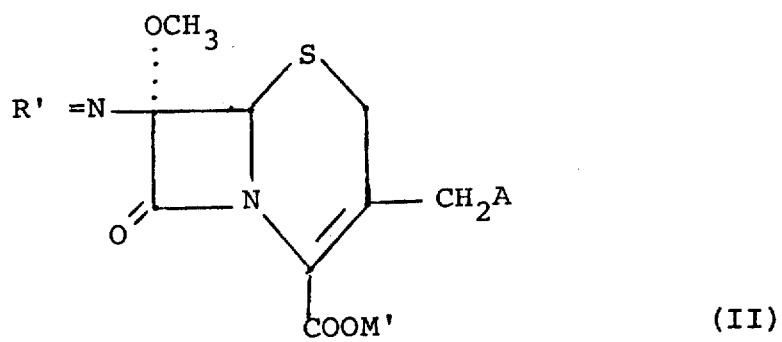

(II)

Signed and sealed this 9th day of April 1974.

(SEAL)
Attest:

EDWARD M. FLETCHER, JR.
Attesting Officer

C. MARSHALL DANN
Commissioner of Patents